US006879681B2

(12) United States Patent
Pedersen et al.

(10) Patent No.: US 6,879,681 B2
(45) Date of Patent: Apr. 12, 2005

(54) MULTI-SERVICE TELECOMMUNICATION SYSTEM AND ASSOCIATED METHODS

(75) Inventors: Claus H Pedersen, Venon (FR); John O'Connell, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/189,353

(22) Filed: Jul. 3, 2002

(65) Prior Publication Data

US 2003/0031306 A1 Feb. 13, 2003

(30) Foreign Application Priority Data

Jul. 6, 2001 (EP) .......................................... 01410085

(51) Int. Cl.⁷ ................................................ H04Q 3/00
(52) U.S. Cl. .............. 379/220.01; 379/219; 379/221.01
(58) Field of Search ...................... 379/220.01, 221.01, 379/221.06, 221.09, 219, 230, 229

(56) References Cited

FOREIGN PATENT DOCUMENTS

| GB | 2 304 491 | * | 3/1997 | ............ H04Q/3/00 |
| WO | 97/07644 | * | 2/1997 | |
| WO | 01/05165 A1 | | 1/2001 | |

* cited by examiner

Primary Examiner—William J. Deane, Jr.

(57) ABSTRACT

A telecommunications system is described comprising: a master server associated with each of a plurality of services available to subscribers; a database for holding profile records for each subscriber, the records identifying the master servers associated with services to which the subscriber subscribes; and a set of call agents arranged to manage user sessions. The master server for each service is arranged to respond to a query from a call agent to communicate a set of trigger events and a set of servers for executing the events. Finally, the call agents are arranged to manage user sessions by retrieving the profile records from the database, querying the master servers for the services to which the user subscribes to obtain the set of trigger events to be reported and the set of servers for executing the reported events and dynamically constructing an event table for a user session based on the response from the master servers.

19 Claims, 2 Drawing Sheets

MULTI-SERVICE TELECOMMUNICATION SYSTEM AND ASSOCIATED METHODS

FIELD OF THE INVENTION

The invention relates to a multi-service telecommunications system and associated methods of operation thereof.

BACKGROUND OF THE INVENTION

The use of data-oriented networks to carry voice and video traffic is increasing. One feature of such networks is to emulate the circuit switching used in conventional PSTN networks using distributed software to control the switching and routing of packets across a packet-based data network. Such networks, and the software used in them, are being developed because of their inherent capacity to support more advanced communication services than are possible using the PSTN, and in particular services that combine telephony technology and Internet technology. In such networks, software components known as call agents or media gateways are used to establish calls, such as real-time voice communications between two, or more, end users for instance.

As the range of communication services increases, it has been recognised the call agent components of the software should preferably be designed so as to be service-independent, that is capable of supporting many different types of voice-related services, and present a well-defined standard interface to a service software layer of the system.

This arrangement has the advantage of enabling a more diverse and flexible commercial exploitation of the different services that interact within the system by allowing different service providers to manage, and to own, the different elements of the call control and service layers. For instance, a network operator may wish to buy, and to re-sell, services that are managed by other service providers. A subscriber may choose to subscribe to advanced services from different service providers, while using yet another service provider, or network operator, to provide basic network access. The advantage for service providers is that they can deploy a service once, but sell it via multiple network operators. The service providers may not even need to own their own switching or call control elements.

This recognition raises the question of what structure should be adopted by the service layer of the software, bearing in mind that the provision of multiple services such as POTS, CLASS, VPN, VCC, mobility, prepaid etc. by multiple service providers will need to be supported. Moreover, each service may offer many features, such as 3-way calling, call waiting, and call forwarding, although the implementation of a given feature may differ across services.

Some services will use centralised service logic and subscriber data as is the case in conventional Service Control Point (SCP) solutions in SS7 Intelligent Networks. Other services will locate logic and data close to the switching elements (e.g. Customer Local Area Signalling Services (CLASS) feature servers). It may also be necessary for services to distribute logic and data to regional servers, where each regional server would serve a set of local call agents.

In addition, some services may locate subscriber logic and/or data outside of the service provider's network and some services may also choose to be mobility-aware. That is, the service will move the subscriber logic and data depending on the subscribers' current location. Such a decision may be made on a service-by-service basis and potentially on a feature-by-feature basis. A service that is mobility-aware requires a mechanism to download subscriber logic or data to "local" servers when a subscriber moves. Such a service will also need to be able to determine the subscribers' current location. However, the call agent layer of the network need not be aware of the mechanism used to download subscriber logic or data, and it should not need to know whether or not services are mobility-aware.

This invention is directed towards providing a flexible architecture for the service layer which can accommodate at least these needs.

SUMMARY OF THE INVENTION

In brief, the invention provides a telecommunications system comprising: a master server associated with each of a plurality of services available to subscribers; a database for holding profile records for each subscriber, the records identifying the master servers associated with services to which the subscriber subscribes; and a set of call agents arranged to manage user sessions. The master server for each service is arranged to respond to a query from a call agent to communicate a set of trigger events and a set of servers for executing the events. Finally, the call agents are arranged to manage user sessions by retrieving the profile records from the database, querying the master servers for the services to which the user subscribes to obtain the set of trigger events to be reported and the set of servers for executing the reported events and dynamically constructing an event table for a user session based on the response from the master servers.

In this way, the call agent layer of the software can be made data-driven. It has access to a subscriber profile record that describes the feature servers, or application servers, which need to be used to manage incoming and outgoing communication to/from the subscriber. A single repository holds the user subscription profiles and associates a master server with each service. A master server provided for each service knows which triggers need to be set and which events need to be reported. The master server also knows which servers are capable of executing reported events.

By associating a master server with each service, each service can control the manner in which feature logic and subscriber data are distributed over a network of servers. This allows each service to effectively adopt its own service architecture. Some will centralise logic and data; others will distribute it, possibly across multiple administrative domains.

In addition, the addition of new services to, and the modification of a subscriber's service profile are both made relatively convenient.

In at least preferred embodiments, at least one of the call agents is provided with a cache system from which profile records for at least a subset of the users can be obtained. Some features and some data may then be cached locally (close to the subscriber), others may be accessed at a central point.

To enable mobility, the system can provide for a user to register temporarily with a call agent, the call agent retrieving the profile record for that subscriber in response to the registration.

To enable feature interaction between different services to be managed, the profile records can prioritize the services.

Viewed from a second aspect the invention provides a method of operating a telecommunications system comprising storing profile records identifying master servers associated with services to which the subscriber subscribes in a database and managing user sessions by: (i) retrieving the profile records from the database; (ii) querying the master servers for the services to which the user subscribes to obtain the set of trigger events to be reported and the set of servers for executing the reported events; and (iii) dynamically constructing an event table for a user session based on the response from the master servers.

Service extensibility can be accommodated within the architecture described above by, for example, directing events that may invoke a new service feature to the master server, until all the relevant feature servers have been updated to support that feature, and are capable of handling those events correctly.

In consequence, a further aspect of the invention provides a method of upgrading a telecommunications system to provide an additional service feature. As described above, the method comprises storing profile records identifying master servers associated with services to which the subscriber subscribes in a database and managing user sessions in the manner described above with the additional step of directing events that invoke the additional service feature to the master server until all feature servers associated with a newly deployed service feature have been updated to handle such events.

Finally, the invention provides separate master server and call agent software components for use in the above described system.

BRIEF DESCRIPTION OF THE INVENTION

A system embodying the invention will now be described, by way of non-limiting example, with reference to the accompanying drawings, in which.

BEST MODE OF CARRYING OUT THE INVENTION

Figure 1:
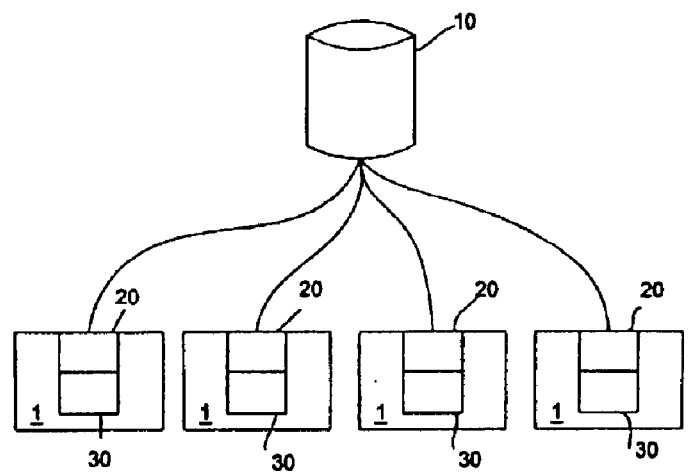
FIGS. 1 and 2 are schematic representations of a multi-service call agent network comprising a plurality of call agents.
Figure 2:
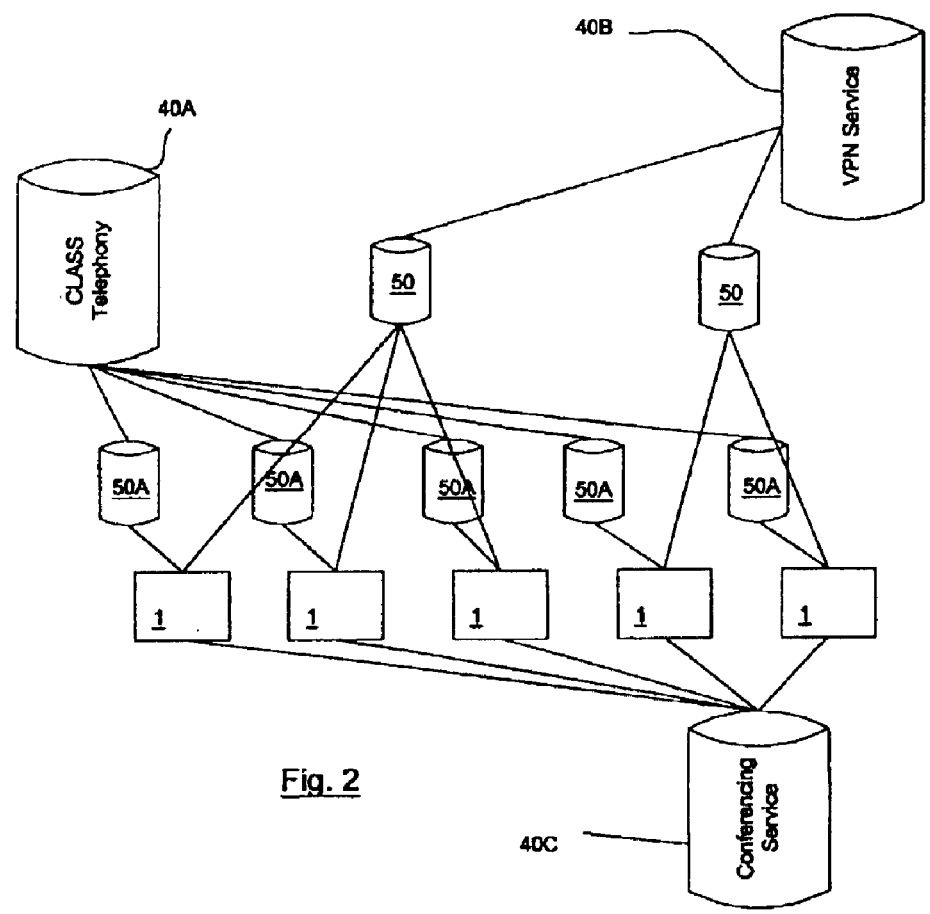

FIGS. 1 and 2 are schematic representations of a multi-service call agent network comprising a plurality of call agents 1 within a data network (not shown). In order to set up communications between users of the network, call agents 1 operate in a manner that is generally well known to those skilled in the art and need not be described in detail herein. As is well known, standard call models have been defined that describe the call control function needed for the setting up and maintaining of the connection route between the users and provide the framework for the description of those call and connection events which can lead to service logic becoming active; in other words those trigger points in a call process and connection process in which the call control can interact with service logic and at which the transfer of the control can take place. The call agents 1 detect such trigger points and invoke services accordingly.

As shown schematically in FIG. 1, a single subscriber service profile database 10 is used to hold service profiles associated with each subscriber. A service profile caching mechanism 20 provided in call agents 1 is used to cache subscriber profiles on the call agents, and to update the cached information if and when the service profile changes. A service interaction module 30, within the call agent, is used to manage the invocation of services, based on detected trigger points, the subscriber's service profile and the prioritization of those services, as defined by the subscriber in the subscriber record. It will be understood that subscriber service profile database 10 whilst logically centralized could be implemented in any suitable distributed or non-distributed manner.

Caching mechanism 20 can operate in any suitable manner according to storage or other constraints within the call agent and according to the type of user. For instance, for mobile users, the subscriber's service profile will be maintained centrally, but could be typically be cached locally and temporarily by the call agent corresponding to the subscribers current location. For non-mobile users, a copy of the profile could be held permanently on their local call agent and only updated when changes are made to the profile. Cache mechanism 20 may be located in a cache server that is separate from call agent 1 and that may be shared between call agents 1. It will be appreciated that many different caching arrangements are possible. Alternatively, the cache mechanism 20 can act as a "proxy" for the master server by accepting events from the call agent, but using logic and data on the master server to execute the event.

As shown in FIG. 2 and as to be described below, for each deployed service (such as the CLASS telephony service, VPN Service and Conferencing services illustrated by way of example in FIG. 2), a master server 40A, 40B, 40C is provided which controls the distribution of feature logic and subscriber data for that particular service.

The subscriber record stored in service profile database 10 includes the list of services to which the subscriber has subscribed, the identity (or, address) of the master server for each service, and the priority of the services. This information is stored in a record having the following general format:

((user, (service, master server), (service, master server) . . . ), service priority table).

The overall function of master server 40A, 40B, 40C is to control the distribution of service logic and subscriber data amongst other servers 50 within the network. In particular, for each subscriber, the master server records which trigger points need to be set for the service and which server in the network is capable of and assigned to processing each trigger point. With this arrangement, different servers may process different trigger points within the same service, depending on the distribution of logic and data in the network.

It can be seen that this arrangement clearly separates a subscriber's service profile—contained in database 10—from the subscriber data associated with a particular service or feature—the location of which is specified in the master servers 40—and, in particular, from the subscriber's CLASS feature data (such as call barring list, short number codes etc.). In the case of CLASS features, for example, 3-way call and call waiting may be executed on a set of servers 50A local to the call agent, while call barring may be executed on the master server 40A using a centrally held call barring list.

Figure 3:
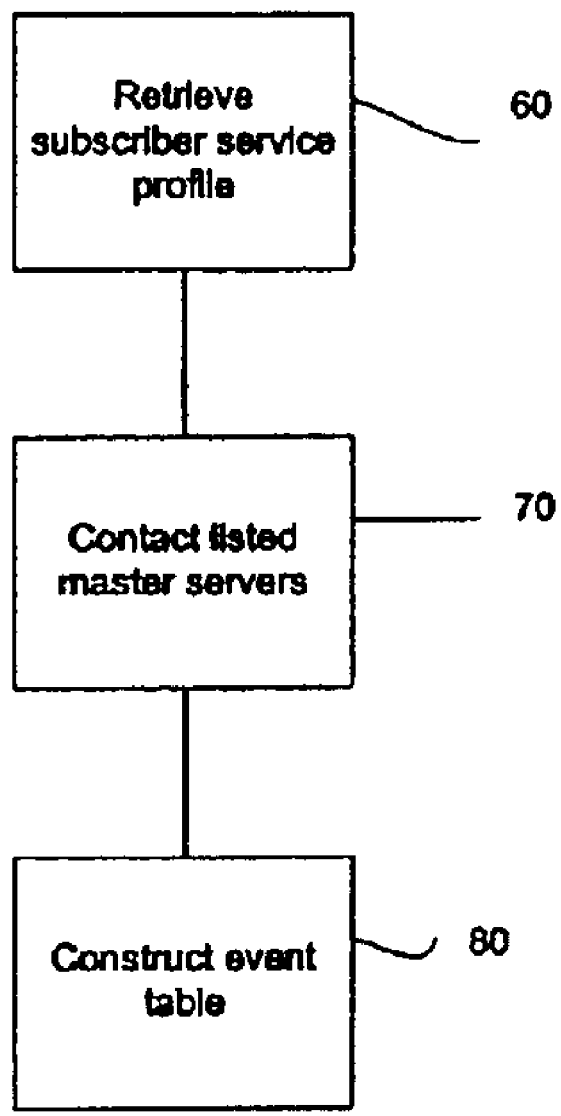
FIG. 3 is a flow chart illustrating the operation of a call agent within such a system.

The general operation of the system described is illustrated in FIG. 3. First a call agent 1 retrieves a subscribers service profile from database 10. This is illustrated in step 60 in FIG. 3. When a call agent retrieves a subscriber's service profile from the database 10, it will retrieve the subscriber's list of services, the identity of the master server associated with each service, and a priority table associated with the subscriber's services.

Once the profile has been retrieved, call agent 1 can contact—step 70—the master server for each service listed in the profile. The master servers each return a per-service table of ((call-state, event), server-x, server-y, server-z, . . . ) tailored to the subscribers. Using this information, the call agent dynamically constructs in step 80 an event table for the subscriber. This table maps each call-state and event to one or more servers that are assigned to handle the event, ordered by service priority. The priority table defines and encapsulates a feature interaction policy for that subscriber which is exploited by the call agent 1 to determine interactions between service features that are potentially triggered by the same event.

When a trigger event occurs, the call agent detects the trigger condition and contacts the servers listed for that event in the specified order according to a general defined service interaction policy that determines whether one, more or all servers in the list are contacted.

The steps shown in FIG. 3 can be carried out at different times according to the specific arrangement used and according to the way in which user sessions are managed within the system. For instance, the retrieval of the user profile from the master server could be carried out each time a user initiates a session, or it could be carried out as part of a cache update according to a suitably defined cache consistency algorithm, or in a mobile environment each time a user registers with a call agent as described below, for instance.

As in the conventional IN architectures, the table of <call state, event, server> can be dynamically updated. When a service gets notified of an event, it may return a new table of <call state, events, server> for that service and the dynamic event table is correspondingly updated.

To support mobility, a subscriber registration/de-registration mechanism allows mobility-aware services to react to subscribers' location changes. The user can register his/her presence with a particular call agent 1 according to their location. By implication, the service network architecture described here is designed to be independent of any given registration mechanism. It will, of course, be appreciated that there may be different types of access devices involved, such as fixed-line telephones, mobile phones, portable computers for instance and the registration mechanism will vary depending on the type of access device. Once a subscriber has registered with a call agent 1, the call agent 1 will retrieve that subscriber's service profile from the database 10. It will then, for each service, go to the corresponding master server and download the set of triggers that need to be provisioned for that subscriber in the call agent as described above.

Registering and de-registering with call agents are also treated as events that can trigger communication with the service layer. For example, an automatic call-back service needs to know when a user registers (i.e. is connected), so that it can deliver pending calls. A call forwarding service would forward all calls to voice-mail if the user is not currently registered (i.e. not connected). In the case of subscriber mobility, a master server may download subscriber logic and data to the cache mechanism associated with a call agent 1 when the user registers with that call agent. By receiving registration and de-registration events, a service can, for instance, manage the migration of subscriber data, moving it to the closest cache server, each time that the user re-connects or take any other action required for that service to manage the mobility of the user.

It will be understood that existing standard call models, such as CS-2, can readily be extended to handle such events, to enable the call agents 1 to support subscriber registration and de-registration.

A suitable data management interface (not shown) is provided to manage updates to the subscriber service profile database 10. This interface is used to update database 10 when a user subscribes to a new service or unsubscribes from an existing service. The interface may also be used by feature servers to change the subscriber's service profile in real-time. For example, an Internet Call Waiting Service may be configured to change the user's service profile depending on whether or not the user is connected to his/her ISP. As soon as the user connects, and registers with the ICW server, the latter will update the user's service profile. If the user de-registers with the ICW server, or disconnects from his/her ISP, the subscriber service profile is updated accordingly. When the service profile record is changed in the database 10, any cached copies must of course also be updated accordingly.

Gateway servers can also be provided and specified by the master servers, that act as proxy servers on behalf of non-network resident services (i.e. services that reside outside of the network operator's network). An example that might make use of such a gateway is a VCC (Virtual Call Centre) server that resides in a call centre. For large call centres, it is more natural to locate the service logic and associated data in the call centre, rather than in the network.

Service extensibility can be accommodated within the architecture described above by, for example, directing events that may invoke a new service feature to the master server, until all the relevant feature servers, for instance all local CLASS servers, have been updated to support that feature, and are capable of handling those events correctly.

A further requirement placed on such networks is that network operators want to be able to make service features available on a non-subscription basis. Features such as automatic callback or last-number-redial may be deployed, available at no charge or on a per-use charge basis, to all subscribers or to a relatively large subset of subscribers in, for instance, a single office or other grouping so that the subscriber does not need to explicitly subscribe for the feature.

To achieve this the subscriber service profile is arranged to prioritise a subscriber's services with respect to office-wide features and any relevant group-wide features. If a subscriber is not allowed to use a specific office-wide or group-wide feature, that exception is managed by the feature server that supports that office-wide or group-wide feature.

As an example, a network operator might deploy an automatic callback service, which allows any subscriber to reconnect to the last person who made an incoming call to that subscriber's telephone. By dialing a specific set of digits, the call agent would re-establish the last call. However, a VCC server might not want to provide this feature to agents in a call centre. That is, agents in the call centre are not permitted to use the automatic callback service. That exception is managed by the automatic callback feature server which maintains a list of subscribers who are not allowed to use the feature.

Certain office-wide or group-wide features need to be treated at higher priority than the subscriber's other services. For instance, calls to emergency services should take priority over any other services to which the user has subscribed. Other office-wide features, such as automatic callback and last-number-redial, would typically be treated at lower priority, allowing other service features to over-ride the default behaviour. When deploying office-wide features, it must be possible to declare whether a feature has higher or lower priority than the other services to which the user has subscribed.

It will be appreciated that the present embodiment takes the form of a set of computer programs which may be marketed in the form of suitable computer program products including the functionality described. It will be appreciated that the invention may equally be implemented as special purpose hardware or any combination of software and hardware.

Although a specific embodiment of the invention has been described, the invention is not to be limited to the specific arrangement so described. The invention is limited only by the claims.

What is claimed is:

1. A telecommunications system in which a plurality of services are available to subscribers, the system comprising:
one or more master servers, with one master server being associated with each of said plurality of services;
a database for holding profile records for the subscribers, the profile records identifying the master servers associated with services to which each subscriber subscribes; and
a plurality of call agent arranged to manage user sessions, wherein (i) the master server associated with each service is arranged to receive a query from a call agent and send a response to said query to communicate a plurality of trigger events and to identify a plurality of servers for executing the trigger events and (ii) the call agents are arranged to manage user sessions by (a) retrieving the profile records from the database, (b) identifying the master servers for the services to which the user subscribes, (c) sending a query to the identified master servers to obtain the plurality of trigger events to be reported and to identify the servers for executing the reported trigger events, and (d) dynamically constructing an event table for each user session based on responses from the master servers.

2. A system as claimed in claim 1, wherein at least one of the call agents is provided with a cache system from which profile records for at least a subset of the subscribers can be obtained.

3. A system as claimed in claim 1, in which a user can register temporarily with a call agent, the call agent retrieving the profile record for that subscriber in response to the registration.

4. A system as claimed in claim 1, in which the profile records prioritize the services.

5. A system as claimed in any claim 1, where in the database is provided with a data management interface for allowing modification of the profile records and wherein at least one service is arranged to modify a profile record via the data management interface in response to an event.

6. A system as claimed in any claim 1, including a feature server for providing processing associated with a service feature, the feature server being provided with a list of subscribers not authorized to use that feature and being arranged to check the list each time the service feature is invoked.

7. A method of operating a telecommunications system comprising storing in a database profile records identifying master servers associated with services, wherein (i) the master servers associated with the services are arranged to receive a query from a call agent and send a response to said query to communicate a plurality of trigger events and to identify a plurality of servers for executing the trigger events and (ii) the call agents are arranged to manage user sessions by: (i) retrieving the profile records from the database; (ii) querying the master servers for the services to which the subscriber subscribes to obtain a set of trigger events to be reported and to identify the master servers for executing reported events; and (iii) dynamically constructing an event table for a user session based on the response from the master servers.

8. A method as claimed in claim 7 comprising maintaining at least one cached copy of at least a subset of the user profile records.

9. A method as claimed in claim 7 wherein the profile record for a particular user is retrieved in response to a registration by a user in a particular locality and stored temporarily in a cache serving that locality.

10. A method of upgrading a telecommunications system to provide an additional service feature, the method comprising storing profile records identifying master servers associated with services to which a subscriber subscribes in a database, wherein (i) the master server associated with the services are arranged to receive a query from a call agent and send a response to said query to communicate a plurality of trigger events and to identify a plurality of servers for executing the trigger events and (ii) the call agents are arranged to manage user sessions by: (i) retrieving the profile records from the database; (ii) querying the master servers for the services to which the user subscribes to obtain a set of trigger events to be reported and a set of feature servers for executing the reported events; (iii) dynamically constructing an event table for a user session based on the response from the master servers and (iv) directing events that invoke the additional service feature to the master server until all feature servers associated with a newly deployed service feature have been updated to handle such events.

11. A master server for use in a telecommunication system comprising program elements arranged to respond to a query from a call agent to communicate a set of trigger events and a set of servers for executing the events, the system comprising:
a database for holding profile records for subscribers, the profile records identifying the master servers associated with services to which each subscriber subscribes; and
a plurality of call agents arranged in manage user sessions,
wherein (i) the master server associated with each service is arranged to receive a query from the call agent and send a response to said query to communicate the set of trigger events and to identify the set of servers for executing the trigger events and (ii) the call agents are arranged to manage user sessions by (a) retrieving the profile records from the database, (b) identify the master servers for the services to which the user subscribes, (c) sending a query to the identified master servers to obtain the plurality of bigger events to be reported and to identify the servers for executing the reported trigger events, and (d) dynamically constructing an event table for each user session based on responses from the master servers.

12. A call agent for use in a telecommunications system in which a plurality of services are available to a plurality of subscribers, the call agent comprising program elements for managing a user session by: (i) retrieving from a database a profile record for a subscriber involved in the user session, the profile record identifying master servers associated with services to which the subscriber subscribes; (ii) querying the identified master servers to obtain a set of trigger events to be reported and a set of servers for executing the reported events and (iii) dynamically constructing an event table for the user session based on responses from the master servers.

13. A call agent as claimed in claim 12 having a cache system from which profile records for at least a subset of the subscribers can be obtained.

14. A call agent as claimed in claim 11 comprising program elements for enabling a subscriber to register temporarily with the call agent, the call agent being arranged to retrieve the profile record for that subscriber in response to the registration.

15. A telecommunications system in which a plurality of services are available to a plurality of subscribers, the system comprising:
   a master server associated with each of the plurality of services;
   a database for holding a profile record for each subscriber, the profile record identifying master servers associated with services to which the subscriber subscribes; and
   a plurality of call agents arranged to manage user sessions,
   wherein the master server for each service is arranged to respond to a query from a call agent to communicate a set of trigger events and to identify a set of servers for executing the events and the call agents are arranged to manage user sessions by retrieving the profile records from the database, querying the master servers for the services to which the user subscribes to obtain the set of trigger events to be reported and the set of servers for executing the reported events and dynamically constructing an event table for a user session based on the response from the master servers, and further wherein, in response to a user registration to a call agent, the call agent is arranged to retrieve the profile record for that user.

16. A telecommunications system comprising:
   a master server associated with each of a plurality or services available to a plurality of subscribers;
   a database for holding a profile record for each subscriber, the profile record identifying master servers associated with services to which the subscriber subscribes; and
   a set of call agents arranged to manage user sessions,
   wherein the master server for each service is arranged to respond to a query from one of the call agents to communicate a set of trigger events and a set of servers for executing the events and the call agents are arranged to manage user sessions by retrieving the profile record from the database, querying the master servers for the services to which the subscriber subscribes to obtain the set of trigger events to be reported and the set of servers for executing the reported events and dynamically constructing an event table for a user session based on the response from the master servers, and further wherein the call agents manage the user sessions in accordance with priority information contained in the profile record.

17. A method of operating a telecommunications system comprising storing a profile record identifying master servers associated with services to which a subscriber subscribes in a database and
   managing a user session by: (i) retrieving the profile records from the database; (ii) querying master servers for the services to which the user subscribes to obtain a set of trigger events to be reported and the set of servers for executing the reported events; and (iii) dynamically constructing an event table for the user session based on responses from the master servers, wherein the profile record is retrieved in response to a registration by the user at a particular location and is stored temporarily in a cache serving that location.

18. A call agent for use in a telecommunications system, the call agent comprising program elements for managing a user session by: (i) retrieving from a database a profile record for a subscriber involved in the user session, the profile record identifying master servers associated with services to which the subscriber subscribes; (ii) querying identified master servers to obtain a set of trigger events to be reported and a set of servers for executing the reported events and (iii) dynamically constructing an event table for the user session based on responses from the master servers, wherein the program elements are arranged for enabling a subscriber to register temporarily with the call agent, the call agent being arranged to retrieve the profile record for that subscriber in response to the registration.

19. A method as claimed in claim 8, wherein the profile record for a particular user is retrieved in response to a registration by a user in a particular locality and stored temporarily in a cache serving that locality.

* * * * *